United States Patent
Fukushi et al.

(10) Patent No.: US 12,384,959 B2
(45) Date of Patent: *Aug. 12, 2025

(54) TUNGSTEN OXIDE MATERIAL, TUNGSTEN OXIDE POWDER MASS FOR ELECTROCHROMIC DEVICE, AND SLURRY FOR PRODUCING ELECTROCHROMIC DEVICE

(71) Applicants: KABUSHIKI KAISHA TOSHIBA, Tokyo (JP); TOSHIBA MATERIALS CO., LTD., Yokohama (JP)

(72) Inventors: Daisuke Fukushi, Yokohama (JP); Shuichi Saito, Yokohama (JP)

(73) Assignees: Kabushiki Kaisha Toshiba, Tokyo (JP); Toshiba Materials Co., Ltd., Yokohama (JP)

( * ) Notice: Subject to any disclaimer, the term of this patent is extended or adjusted under 35 U.S.C. 154(b) by 355 days.

This patent is subject to a terminal disclaimer.

(21) Appl. No.: 18/069,301

(22) Filed: Dec. 21, 2022

(65) Prior Publication Data
US 2023/0120411 A1 Apr. 20, 2023

Related U.S. Application Data

(63) Continuation of application No. PCT/JP2021/030727, filed on Aug. 23, 2021.

(30) Foreign Application Priority Data

Sep. 28, 2020 (JP) .................... 2020-161682

(51) Int. Cl.
C09K 9/00 (2006.01)
C01G 41/00 (2006.01)
G02F 1/1524 (2019.01)

(52) U.S. Cl.
CPC .............. C09K 9/00 (2013.01); C01G 41/006 (2013.01); G02F 1/1524 (2019.01);
(Continued)

(58) Field of Classification Search
CPC ....... C09K 9/00; G02F 1/1524; C01G 41/006; C01P 2002/77; C01P 2002/78;
(Continued)

(56) References Cited

U.S. PATENT DOCUMENTS 6,005,705 A 12/1999 Schmidt et al.
10,283,776 B2 5/2019 Sasaki et al.
(Continued)

FOREIGN PATENT DOCUMENTS

CN 101023498 A 8/2007
CN 105060733 A 11/2015
(Continued)

OTHER PUBLICATIONS

Extended European Search Report (Application No. 21872054.8) dated Dec. 5, 2024 (7 pages).
(Continued)

*Primary Examiner* — Bijan Ahvazi
(74) *Attorney, Agent, or Firm* — BURR PATENT LAW, PLLC

(57) ABSTRACT

According to one embodiment, a tungsten oxide material containing potassium is provided. The tungsten oxide material has a shape of particles including a central section and a peripheral section adjacent to the central section, and having an average particle size of 100 nm or less. A periodicity of a crystal varies between the central section and the peripheral section. In addition, a tungsten oxide powder mass for an electrochromic device including 80% by mass to 100% by mass of the tungsten oxide material is provided. Moreover, a slurry for producing an electrochro-
(Continued)

mic device containing the above tungsten oxide material is provided.

9 Claims, 3 Drawing Sheets

(52) U.S. Cl.
CPC ...... *C01P 2002/77* (2013.01); *C01P 2002/78* (2013.01); *C01P 2002/85* (2013.01); *C01P 2004/64* (2013.01); *C01P 2006/40* (2013.01); *C01P 2006/60* (2013.01)

(58) Field of Classification Search
CPC .............. C01P 2202/85; C01P 2004/64; C01P 2006/40; C01P 2006/60
See application file for complete search history.

(56) References Cited

U.S. PATENT DOCUMENTS

| | | | |
|---|---|---|---|
| 10,450,200 | B2 | 10/2019 | Buissette et al. |
| 2016/0264430 | A1* | 9/2016 | Buissette ............... C01G 41/00 |
| 2018/0183054 | A1 | 6/2018 | Zhang |
| 2022/0100045 | A1 | 3/2022 | Fukushi et al. |

FOREIGN PATENT DOCUMENTS

| | | | | |
|---|---|---|---|---|
| CN | 108504271 A | * | 9/2018 | ........... C09D 133/04 |
| CN | 108659812 A | * | 10/2018 | ............. B82Y 20/00 |
| CN | 108862389 A | | 11/2018 | |
| CN | 109021962 A | | 12/2018 | |
| CN | 110898827 A | | 3/2020 | |
| CN | 114326240 A | | 4/2022 | |
| EP | 3666846 A1 | * | 6/2020 | ............. B32B 17/10 |
| JP | H03-043716 A | | 2/1991 | |
| JP | H09-512112 A | | 12/1997 | |
| JP | 2015-044922 A | | 3/2015 | |
| JP | 2016-538215 A | | 12/2016 | |
| JP | 2018-518798 A | | 7/2018 | |
| WO | 2016/039157 A1 | | 3/2016 | |
| WO | 2018/235833 A1 | | 12/2018 | |

OTHER PUBLICATIONS

International Search Report and Written Opinion (Application No. PCT/JP2021/030727) dated Nov. 16, 2021.
Kai et al., *"Synthesis and Electrochromic Properties of Hybrid Films Comprising WO3 Nanowires Coated with V2O5 Nanoparticles,"* Journal of Vacuum Science and Technology, vol. 38, Issue 2, Feb. 2018, pp. 87-93 (with English translation).
Chinese Office Action (with English translation) dated May 14, 2025 (Application No. 202180058572.3).

* cited by examiner

TUNGSTEN OXIDE MATERIAL, TUNGSTEN OXIDE POWDER MASS FOR ELECTROCHROMIC DEVICE, AND SLURRY FOR PRODUCING ELECTROCHROMIC DEVICE

CROSS-REFERENCE TO RELATED APPLICATION

This application is a Continuation Application of PCT Application No. PCT/JP2021/030727, filed Aug. 23, 2021 and based upon and claiming the benefit of priority from prior Japanese Patent Application No. 2020-161682, filed Sep. 28, 2020, the entire contents of all of which are incorporated herein by reference.

FIELD

Embodiments described herein generally relate to a tungsten oxide material, a tungsten oxide powder mass for an electrochromic device, and a slurry for producing an electrochromic device.

BACKGROUND

Electrochromic devices are devices which utilize a reversible change in photophysical properties upon applying electric charge to a substance. Electrochromic devices are used for displays or light-modulating systems, making use of the capability of altering photophysical properties. Examples of the light-modulating systems include light-modulating glass, light-modulating eyeglasses, and antidazzle mirror. The light-modulating systems are used in various fields such as vehicles, aircrafts, and buildings.

An example of a material used as a material for electrochromic devices is tungsten oxide powder. A reversible reaction that occurs when an electric charge is applied to a material exhibiting electrochromism is an oxidation-reduction reaction that involves insertion and extraction of electrons. Thus, as an approach to improve the rate of the reversible reaction, an attempt has been made to provide a hopping conduction characteristic to a material for electrochromic devices.

Further, in order to improve the initial performance of electrochromic devices, an attempt has been made to include an alkaline metal salt in a coating solution used to form an electrochromic layer that includes a tungsten oxide or a molybdenum oxide. Specifically, there is an aim to form an electrochromic device ready to fully exhibit its functions immediately after being produced, by adding alkaline metal ions to an electrochromic oxide layer in advance in its initial state.

In addition, an attempt has been made to suppress degradation of the initial characteristics of the device that occurs when the coloring and discoloring are repeated, by using an electrochromic substance layer obtained by adding tungstate, such as lithium tungstate, sodium tungstate, and potassium tungstate, to a tungsten oxide as a chromogen of the electrochromic device. Namely, the objective of this approach is to obtain long-life electrochromic devices by improving the electrochromic substance.

DETAILED DESCRIPTION

According to one embodiment, a tungsten oxide material containing potassium is provided. The tungsten oxide material has a shape of particles including a central section and a peripheral section adjacent to the central section, and having an average particle size of 100 nm or less. A periodicity of a crystal varies between the central section and the peripheral section. In addition, a tungsten oxide powder mass for an electrochromic device including 80% by mass to 100% by mass of the tungsten oxide material is provided. Moreover, a slurry for producing an electrochromic device containing the above tungsten oxide material is provided.

A tungsten oxide material according to an embodiment includes a tungsten oxide powder including particles having an average particle size of 100 nm or less. The powder contains potassium, and when the powder is analyzed with a scanning transmission electron microscope (STEM), a periodicity of a crystal varies between a peripheral section and a central section.

The tungsten oxide material according to the embodiment exhibits electrochromism, that is, a reversible change in photophysical properties is observed when electric charge is applied to the material. Therefore, the tungsten oxide material can be applied to, for example, electrochromic devices as electrochromic elements. Namely, the tungsten oxide material according to the embodiment can function as a tungsten oxide material for electrochromic devices. Hereinafter, the tungsten oxide material may be referred to as a tungsten oxide powder for electrochromic devices or simply referred to as a tungsten oxide powder. Since the tungsten oxide material contains potassium (K) in the powder particles of the tungsten oxide ($WO_3$), the tungsten oxide material may also be referred to as $K$—$WO_3$.

If the tungsten oxide material is used for electrochromic devices, a response time for color switching can be improved. By having the above-described structure, the tungsten oxide material can further improve the response time as compared with the case of using a tungsten oxide material provided with hopping conduction characteristics.

Figure 1:
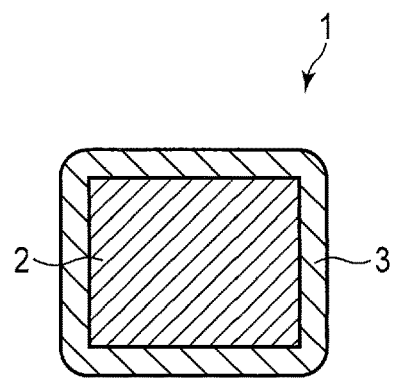
FIG. 1 is a cross-sectional view schematically showing an example of a particle of a tungsten oxide powder according to an embodiment.
Figure 2:
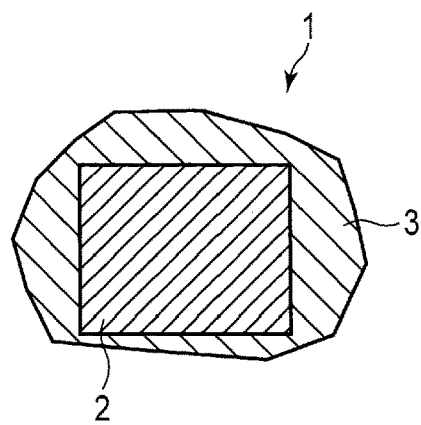
FIG. 2 is a cross-sectional view schematically showing another example of a particle of the tungsten oxide powder according to the embodiment.

FIGS. 1 and 2 show examples of a powder particle of the potassium-containing tungsten oxide according to the embodiment. FIGS. 1 and 2 each schematically show a cross section of a single particle included in the powdery tungsten oxide material. The depicted tungsten oxide powder particles 1 each include a central section 2 and a peripheral section 3 with varying periodicity of the tungsten oxide crystal. The peripheral section 3 is adjacent to the central section 2. FIG. 1 shows an example in which the width of the peripheral section 3 viewed in cross section is uniform over the entire periphery of the cross section. FIG. 2 shows an example in which the width of the peripheral section 3 varies depending on the position. The width of the peripheral section 3 may be uniform or non-uniform. Namely, the peripheral section 3 may be present as a layer having a uniform thickness on the central section 2 as core, or present as a layer having a non-uniform thickness on the central section 2 as core. In the examples shown in the figures, the central section 2 has a rectangular cross-section; however, the shape of the central section 2 is not limited to the examples shown in the figures. The central section 2 may have, for example, a square or trapezoidal cross-sectional shape and a cross-sectional shape similar thereto.

Both FIGS. 1 and 2 show an example in which the peripheral section 3 covers the entire periphery of the central section 2. The peripheral section 3 is preferably present on 80% to 100% of the outer periphery of the central section 2.

An average particle size of the tungsten oxide material powder particles is 100 nm or less. Herein, the average particle size refers to an average particle size of primary particles of the tungsten oxide powder, that is, an average primary particle size. The average particle size is obtained as follows. A sample of the tungsten oxide powder is observed using a field emission scanning electron microscope (FE-SEM) to obtain a magnified image. The longest diagonal line of the K—WO$_3$ powder shown in the magnified image is determined as the particle size of that powder particle. An average of the particle sizes of 100 powders arbitrarily extracted is determined as the average particle size. The magnification of the magnified image obtained by the FE-SEM is set to 50,000 times or more.

Specifically, an FE-SEM image is used. The particle sizes of 100 primary particles whose contours are clearly visible in the FE-SEM image are measured, and an average value thereof is taken as an average particle size. If there are only secondary particles and no primary particles can be confirmed, the secondary particles may be pulverized to be measured as the primary particles. The measurement of the average particle size through FE-SEM observation can be performed on a member containing a tungsten oxide powder in a device that uses the tungsten oxide powder, such as a film containing a tungsten oxide powder, for example, an electrochromic layer included in an electrochromic element, etc. For example, a cross-section of such a film is subjected to FE-SEM observation to obtain an enlarged photograph of the cross-section, and the obtained FE-SEM image is used to determine an average particle size as described above.

If the average particle size of the tungsten oxide powder exceeds 100 nm, a sufficient surface area cannot be achieved. Thus, the average particle size is preferably 100 nm or less. The lower limit of the average particle size is not particularly limited; however, the average particle size is preferably 5 nm or more. If a powder material having an average particle size of 5 nm or more is used, the productivity of the electrochromic device will be favorable. Thus, the average particle size is preferably 5 nm to 100 nm, and more preferably 10 nm to 50 nm.

The tungsten oxide powder contains potassium (K). Potassium may be present as metal potassium or a potassium compound. Examples of the potassium compound include oxides (including composite oxides). By containing potassium, electrical conductivity of the tungsten oxide powder can be made great.

In the tungsten oxide material, potassium is not mixed with the WO$_3$ powder simply as independent powder particles of metal potassium or a potassium compound, but contained in each powder particle included in the tungsten oxide powder. Thus, in an electrochromic device using K—WO$_3$ powder, a distribution of the potassium in the electrochromic layer will not be variable.

When the tungsten oxide powder is subjected to a scanning transmission electron microscopy (STEM) analysis, the periodicity of the WO$_3$ crystal would vary between the central section and the peripheral section. An HAADF-STEM image is used for the STEM analysis. The HAADF-STEM refers to high angle annular dark field-scanning transmission electron microscopy. Hereinafter, the HAADF-STEM image may be simply referred to as a STEM image. In performing a STEM measurement, a thin film sample of the tungsten oxide powder is fabricated with a microtome using a dispersion method. Also, the measurement is performed at a magnification of 10,000,000 with the accelerating voltage of the STEM set to 200 kV.

Figure 3:
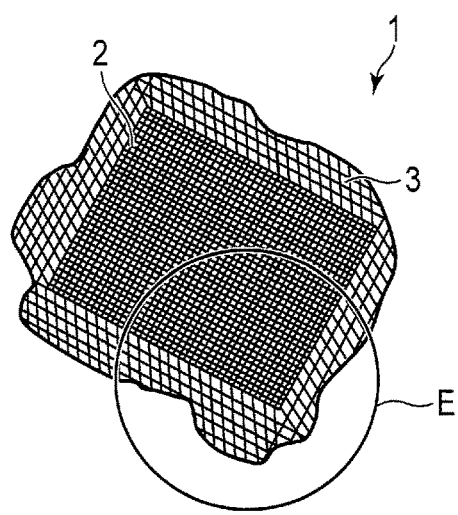
FIG. 3 is a cross-sectional view schematically showing a periodicity of a crystal in a particle of the tungsten oxide powder according to the embodiment.
Figure 4:
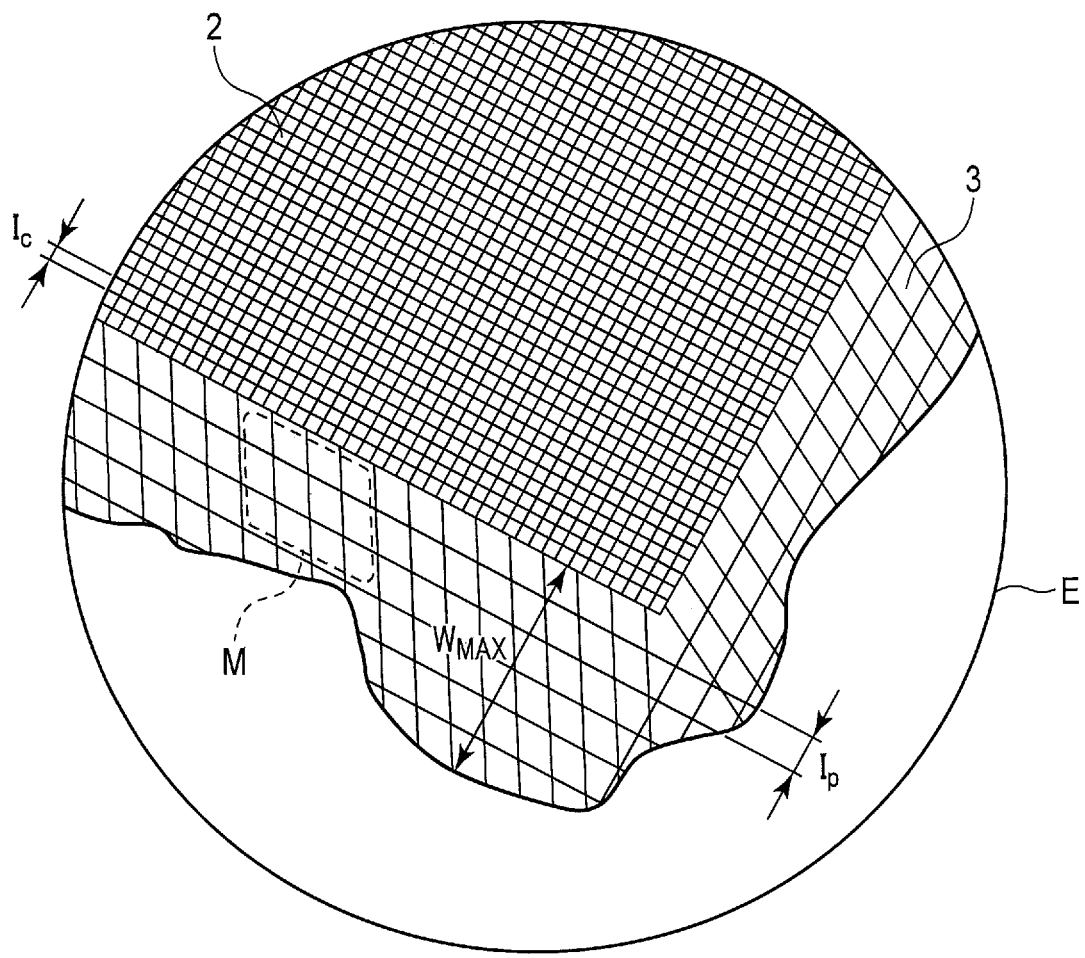
FIG. 4 is an enlarged cross-sectional view of section E in FIG. 3.

The periodicity of the crystal varying between the central section and the peripheral section indicates that there are regions with varying interatomic distance within the powder particles. FIGS. 3 and 4 show a schematic cross-sectional view illustrating the concept of the varying crystal periodicity. FIG. 4 is an enlarged cross-sectional view of section E shown in FIG. 3. The tungsten oxide material has a crystal structure in which plural phases, which intersect with a direction from the inside toward the surface of the tungsten oxide powder particle 1 and are parallel to each other, are sequentially arranged in a direction toward the particle surface. In the tungsten oxide powder particle 1, an interatomic distance $I_c$ between adjacent phases among the plural phases in the central section 2 and an interatomic distance $I_p$ between adjacent phases among the plural phases in the peripheral section 3 differ from each other. When the periodicity of the crystal is the same throughout the whole particle, the interatomic distance is constant. The interatomic distance being constant indicates that the variation in the interatomic distance is 0.2 Å (angstrom) or less in the magnified image obtained by the STEM. The variation in the interatomic distance is a deviation from an average value of five discretionarily selected interatomic distances.

Figure 5:
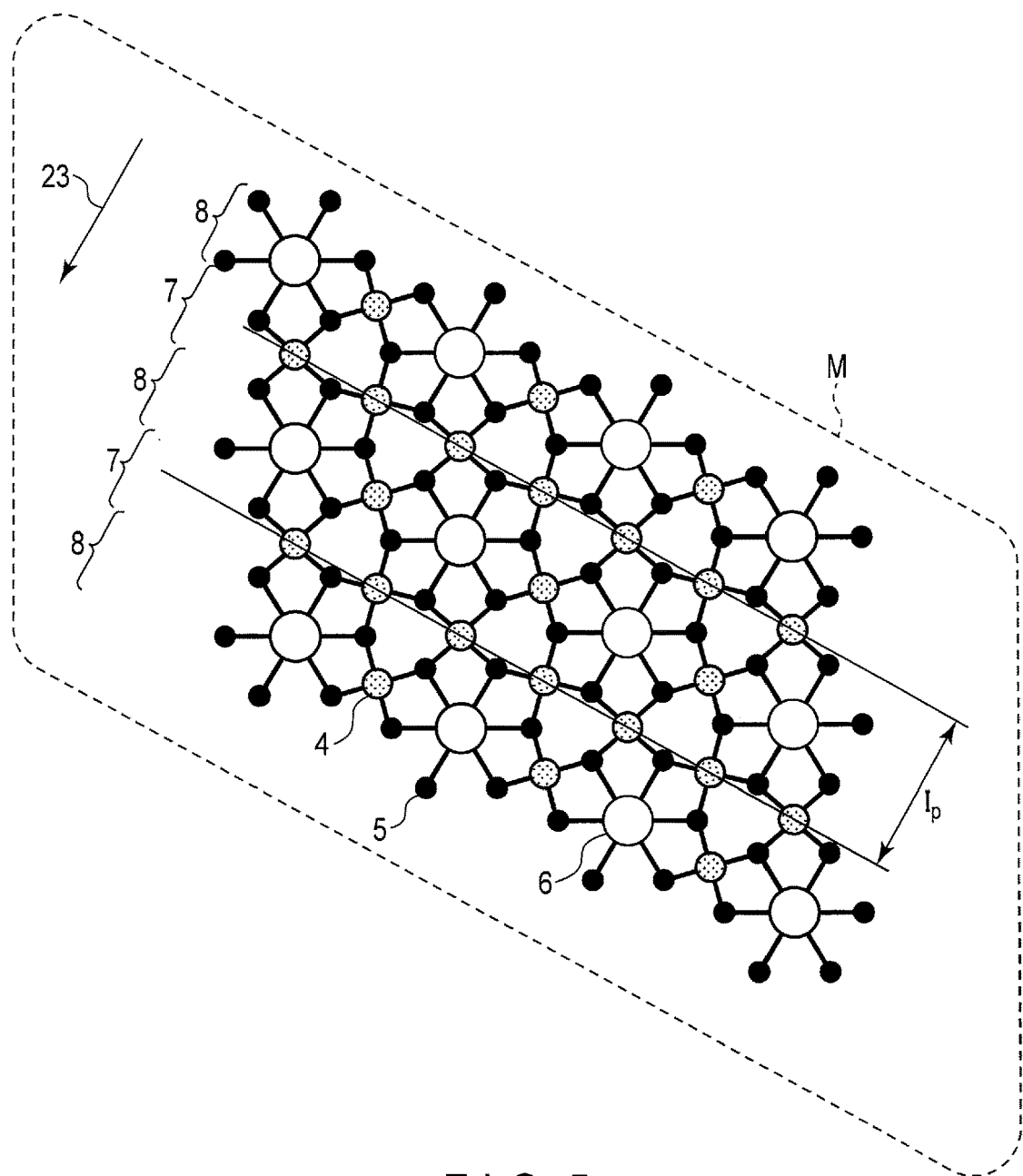
FIG. 5 is an enlarged view schematically showing a molecular structure of section M in FIG. 4.

Each of the plural phases may be a phase having a layered structure. Herein, the interatomic distance is obtained based on the crystal structure in which these phases are arranged in parallel. A detailed description will be given with reference to FIG. 5. FIG. 5 is a magnified view of the section M shown in FIG. 4, and schematically shows the molecular structure of this section. FIG. 5 schematically shows the molecular structure of the peripheral section 3 of the tungsten oxide powder particle 1.

Each of the parallel phases that are sequentially arranged along the direction 23 from the center to the surface of the tungsten oxide powder particle 1 may include, for example, first crystal phases 7, in which tungsten atoms 4 and oxygen atoms 5 are aligned to form a layered structure, and second crystal phases 8, in which potassium atoms 6, tungsten atoms 4, and oxygen atoms 5 are aligned to form a layered structure, as shown in FIG. 5. Both the first crystal phases 7 and the second crystal phases 8 may intersect with the direction 23 toward the powder particle surface. In addition, the first crystal phases 7 and the second crystal phases 8 may be arranged alternately along the direction 23 toward the surface. The interatomic distance indicates an interval between the first crystal phases 7, in which the tungsten atoms 4 and the oxygen atoms 5 are aligned. For example, the second crystal phases 8, in which the potassium atoms 6, tungsten atoms 4, and oxygen atoms 5 are aligned, are not taken into consideration.

Specifically, a STEM analysis is performed considering, as the interatomic distance, the interval at which the layers of the tungsten atoms 4 and the oxygen atoms 5 are sequentially arranged in parallel in the direction 23 from the center toward the surface of the powder particle. Namely, the periodicity of the crystal herein can be said to refer to the periodicity of the first crystal phase corresponding to the crystal of $WO_3$ not containing potassium. The direction 23 from the inside toward the surface of the powder particles may intersect with the interface between the central section 2 and the peripheral section 3.

While FIG. 5 represents the molecular structure of the peripheral section 3 of the tungsten oxide powder particle 1, the interatomic distance $I_c$ is also obtained for the central section 2 according to the STEM analysis in the same manner as in the case of the interatomic distance $I_p$ corresponding to the interval between the first crystal phases 7 having uninterruptedly lined up tungsten atoms 4 and oxygen atoms 5, which are arranged in the direction 23 toward the surface in the peripheral section 3. Namely, in the central section 2, the interval between the parallel crystal phases of uninterruptedly lined up tungsten atoms and oxygen atoms is determined as the interatomic distance $I_c$.

With the periodicity of the crystal varying between the central section and the peripheral section, the electrical conductivity of the tungsten oxide powder can be increased. An increase in electrical conductivity indicates a decrease in resistance value. Thus, when the tungsten oxide material is applied to the electrochromic device, the response time for color switching can be improved.

A ratio $I_p/I_c$ of the interatomic distance $I_p$ in the peripheral section to the interatomic distance $I_c$ in the central section is preferably in a range of 1.1 to 3. With the ratio $I_p/I_c$ between the interatomic distances in the peripheral section and the central section being 1.1 or more, there is a significant difference in periodicity of the crystals between the respective regions, allowing the above-described effect to be exhibited. On the other hand, with the ratio $I_p/I_c$ between the interatomic distances in the central section and the peripheral section being 3 or less, the regularity of the crystal in the peripheral section is easily maintained. Thus, the ratio $I_p/I_c$ between the interatomic distance $I_p$ in the peripheral section and the interatomic distance $I_c$ in the central section is preferably in a range of 1.1 to 3, and more preferably in a range of 1.5 to 2.5.

The interatomic distance $I_c$ in the central section is preferably in a range of 2.8 Å (angstrom) to 3.9 Å. With the interatomic distance $I_c$ in the central section being within this range, the ratio $I_p/I_p$ thereof to the interatomic distance $I_p$ in the peripheral section can be easily controlled because the interatomic distance $I_c$ is suitable. Also, with the interatomic distance $I_c$ in the central section kept to be 3.9 Å or less, the regularity of the crystal in the central section itself can be easily maintained. The interatomic distance $I_p$ in the peripheral section is preferably in a range of 3.5 Å to 8.0 Å.

The abundance of potassium is preferably greater in the peripheral section than in the central section. With a large amount of potassium present in the peripheral section, the interatomic distance of the crystal in the peripheral section can be increased. Thus, the electrical conductivity of the tungsten oxide powder can be increased. As described above, since the resistance value decreases as the electrical conductivity increases, the response time for color switching in the electrochromic device can be improved. The tungsten oxide material according to the embodiment may include powder particles which do not contain potassium in the central section but contain potassium only in the peripheral section.

The proportional abundance of potassium can be measured according to energy dispersive X-ray spectrometry (EDX). Through the EDX analysis, color-mapping of potassium contained in the tungsten oxide powder is performed. As the measurement conditions, the accelerating voltage is set to 15.0 kV, an area analysis is performed at a magnification of 1,000 or more, and the potassium abundance is determined from a ratio of the number of atoms between K (potassium) and W (tungsten) obtained according to the ZAF method.

The ZAF method is a correction method combining three corrections, which are atomic-number correction (Z), absorption correction (A), and fluorescence correction (F). The atomic-number correction (Z) is for correcting the ratio at which electrons applied to the sample are split into intruding electrons and scattered electrons. The absorption correction (A) is for correcting the amount of characteristic X-rays generated in the sample that are absorbed before exiting outside the sample. The fluorescence (excitation) correction (F) is for correcting the fluorescent X-ray intensity excited by the X-rays generated in the sample. The ZAF method is a common method as a correction method for EDX.

The peripheral section preferably has a maximum width of 1.5 nm to 5 nm. If the maximum width of the peripheral section is 1.5 nm or more, the proportion of presence of the peripheral section 3 is sufficient, whereby the above-mentioned effects are achieved. If the maximum width of the peripheral section is 5 nm or less, the proportion of the peripheral section 3 that is present may be appropriate. The maximum width of the peripheral section, in which the interatomic distance $I_p$ is in a range of 3.5 Å to 8.0 Å, is preferably 1.5 nm to 5 nm.

The width of the peripheral section nearly coincides with the region having a large amount of potassium. That is, in the tungsten oxide material according to the embodiment, the periodicity of the crystal varies due to having potassium present in the peripheral section. With potassium present in the peripheral section, the electrical conductivity of the tungsten oxide powder can be improved. Color switching in the electrochromic device is a reversible reaction caused by input and output of electrons. By having the peripheral section present at a predetermined proportion, inputting and outputting electrons can be easily performed in the peripheral section. Namely, the rate of the reversible reaction can be increased by performing input and output of electrons at the surface of the powder particles. Thus, the maximum width of the peripheral section is preferably within a range of 1.5 nm to 5 nm, and more preferably within a range of 2 nm to 4 nm. Regions of the peripheral section not having the maximum width may be thinner than this.

A tungsten oxide powder having a maximum width of the peripheral section within a range of 2 nm to 4 nm tends to have a fluidity in a range preferable from the viewpoint of layer formation described later. As described later, the fluidity of the tungsten oxide powder can be assessed based on the angle of repose.

The maximum width of the peripheral section can be determined as follows. First, an interface between the central section and the peripheral section of the tungsten oxide powder particles is ascertained in the STEM image showing the cross section of the tungsten oxide powder particles. The interface is determined as an outer periphery of the central section, and lines perpendicular to tangential lines for this outer periphery are drawn from the outer periphery of the central section to the powder particle surface. The lengths of the lines drawn from the central section straight toward the outer side in this manner are determined as the widths of the peripheral section at those positions, and the longest width among these widths is determined as the maximum width of the peripheral section. For example, in the exemplar tungsten oxide powder particle 1 shown in FIGS. 3 and 4, the width $W_{MAX}$ shown in FIG. 4 corresponds to the maximum width of the peripheral section 3.

The proportion of the peripheral section present on the outer periphery of the central section can be determined according to the STEM analysis. In the STEM image showing the cross-section of the tungsten oxide powder particles, the interface between the central section and the peripheral section is determined as the outer periphery of the central section in the portion(s) where the central section and the peripheral section are adjacent to each other, and the particle surface is determined as the outer periphery of the central section in the portion(s) where there is no peripheral section adjacent on the outer side of the central section. Among the combined entire outer periphery of the central section, the proportion of the portion(s) where the adjacent peripheral section is present is ascertained.

The content of potassium in the tungsten oxide powder is preferably within the range of 1 mol % to 50 mol %. Herein, the potassium content in the tungsten oxide powder refers to an amount of potassium included in the tungsten oxide powder. Namely, the content refers to a total amount of potassium included in the central section and potassium included in the peripheral section. When the content of potassium in the tungsten oxide powder is 1 mol % or more, the above-mentioned effects obtained by containing potassium is fully exhibited. Also, when the potassium content is 50 mol % or less, favorable cost-effectiveness can be achieved. This is because even if potassium is contained in an amount exceeding 50 mol %, effects beyond those obtained when the potassium content is 50 mol % cannot be obtained. Thus, the content of potassium included in the tungsten oxide powder is preferably in the range of 1 mol % to 50 mol %, and more preferably in the range of 5 mol % to 35 mol %.

The content of potassium in the tungsten oxide powder is determined according to the inductively coupled plasma (ICP) emission spectrometric analysis method. The ICP emission spectrometric analysis is a method of measuring the wavelength of the light generated by applying energy to the sample and vaporizing the sample into an atomic state. Since light corresponding to the atoms of the sample is emitted, an analysis at the scale of elements can be made. Also, since the measurement target is vaporized, the content of the entire sample can be measured. In the ICP emission spectroscopy, first, the sample is dissolved with an acid and alkali to form a liquid, and introduced into argon plasma. The concentrations of K (potassium) and W (tungsten) are measured by measuring the light emitted through excitation of the sample with a detector. The concentration of K measured is converted into an amount of potassium atoms alone, and the concentration of W is converted into an amount of $WO_3$ molecules. The content of potassium is determined using these values obtained by converting the concentrations of K and W into the amount of solitary potassium and the amount of $WO_3$, and treating the tungsten oxide powder as K—$WO_3$ powder composed of K and $WO_3$.

Also, when the content of potassium is measured by performing an X-ray photoelectron spectroscopy (XPS) analysis on the above tungsten oxide powder, the ratio $K_{XPS}/K_{ICP}$ of the content $K_{XPS}$ of potassium obtained according to the XPS method to the content $K_{ICP}$ of potassium obtained according to the above ICP emission spectrometric analysis method is preferably 1.05 or more.

The XPS analysis is a method in which a sample is irradiated with soft X-rays and photoelectrons released upon ionization of the sample are measured. The XPS analysis is an analysis method effective for measuring an element present in a neighborhood of a few nm depth from the sample surface. As described above, the ICP analysis is a method effective for quantifying the abundance in the entire sample. In contrast, the XPS analysis is a method effective for quantifying the abundance in the vicinity of the sample surface.

The ratio $K_{XPS}/K_{ICP}$ of the amount of potassium obtained according to the XPS analysis and the amount of potassium obtained according to the ICP analysis being 1.05 or more indicates that the abundance of potassium is greater in vicinity of the surface of the powder particles of the tungsten oxide powder. In other words, the ratio $K_{XPS}/K_{ICP}$ of the amounts of potassium according to these analysis methods being less than 1.05 indicates that the amount of potassium present at the particle surface is little. This indicates that there is little potassium in the peripheral section. Controlling the abundance of potassium is effective for controlling the aforementioned interatomic distance.

The upper limit of the ratio $K_{XPS}/K_{ICP}$ of the potassium content is preferably 5 or less. By limiting the ratio to 5 or less, the ratio of the interatomic distance between the central section and the peripheral section can easily fall within a predetermined range.

The measurement conditions of the XPS analysis are as follows: single crystalline spectroscopic Al K-α ray as an X-ray source; an X-ray output being 50.0 W; an analysis region of φ200 μm; and an angle between the sample surface and the detector being 45°.

The tungsten oxide powder for electrochromic devices described above has improved electrical conductivity. Since the electrical conductivity is high, the tungsten oxide powder has a low resistance value. Also, since the tungsten oxide powder has the peripheral section, the input and output of electrons can be performed mainly in the peripheral section. Thus, the rate of input and output of electrons is improved.

Specifically, the electrical conductivity of the tungsten oxide powder may be $1\times10^{-5}/\Omega\cdot cm$ to $3\times10^{-3}/\Omega\cdot cm$. The electrical conductivity herein refers to electrical conductivity measured by a four-terminal method. The tungsten oxide powder ($WO_3$) containing no potassium has an electrical conductivity of less than $1\times10^{-5}/\Omega\cdot cm$. As described above, by containing potassium, the electrical conductivity can be increased. Also, by limiting the electrical conductivity to $1\times10^{-3}/\Omega\cdot cm$, it is possible to prevent an erroneous response reaction for color switching due to unintended charge transfer that may occur when the electrical conductivity becomes too high. Therefore, the electrical conductivity of the tungsten oxide powder is preferably in a range of $1\times10^{-3}$ $\Omega\cdot cm$ to $3\times10^{-3}/\Omega\cdot cm$, and more preferably in a range of $5\times10^{-5}$ $\Omega\cdot cm$ to $1\times10^{-3}/\Omega c\cdot m$.

The electrical conductivity is measured in the following manner. A φ20 mm cylindrical unit is filled with 1 g to 3 g of sample powder. As a measurement method, a four-terminal method is used, in which four terminals are arranged at an interval of 3 mm between electrodes in a linear direction. A volumetric resistivity is measured with pressures of 4 N (Newton), 8 N, 12 N, 16 N and 20 N being applied to the sample by a hydraulic jack, and the lowest value of the volumetric resistivity is defined as the volumetric resistivity of the material. The reciprocal of the obtained volumetric resistivity is calculated and converted into electrical conductivity.

When the angle of repose of the tungsten oxide powder is measured, the angle of repose is preferably in a range of 30° to 45°. The angle of repose indicates fluidity of the powder. The smaller the angle of repose, the better the fluidity of the powder. With good fluidity of the powder, the powder can be uniformly dispersed when forming a layer using the powder. Namely, it is possible to form an electrochromic layer in which the tungsten oxide powder is uniformly dispersed. If the angle of repose is 30° or more, the fluidity is suitably high, and the supply amount is stabilized. Also, if the angle of repose is 45° or less, the fluidity is good, and aggregation that may result from low fluidity is less likely to occur.

The angle of repose is measured using a Scott volumeter specified in Tungsten Molybdenum Industrial Standard TMIAS0101 (powder property test method: 2010). TMIAS0101 is an industrial standard issued by the Japan Tungsten & Molybdenum Industries Association.

Figure 6:
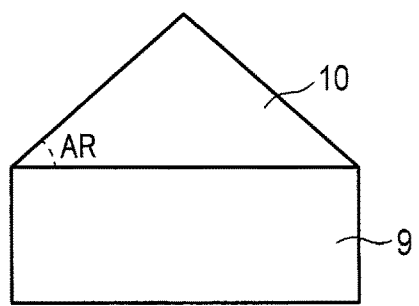
FIG. 6 is a diagram showing a concept of a method of measuring an angle of repose of the tungsten oxide powder according to the embodiment.

FIG. 6 shows a conceptual diagram of a method for obtaining the angle of repose. The angle of repose is measured using a Scott volumeter. A tungsten oxide powder sample 10 is poured into a funnel of the Scott volumeter. The tungsten oxide powder sample 10 is poured until a cup 9 placed immediately below the funnel is filled with the tungsten oxide powder sample 10 and the tungsten oxide powder sample 10 overflows around the cup 9. An angle formed by the upper surface of the cup 9 and the heap of the tungsten oxide powder sample 10 is measured and defined as an angle of repose AR. If the tungsten oxide powder sample 10 does not naturally fall down to the cup 9, the tungsten oxide powder sample 10 is lightly stirred with a brush on top of a wire mesh provided in the funnel, so as to pour in the sample.

For using the tungsten oxide material as a material for electrochromic devices, it is preferable that a tungsten oxide powder mass for electrochromic devices containing 80% by mass to 100% by mass of the tungsten oxide material be prepared. By containing the tungsten oxide material having the peripheral section according to the embodiment at a proportion of 80% by mass or more, the above-described improved electrical conductivity is obtained. Therefore, a tungsten oxide powder mass for electrochromic devices containing 80% by mass or more of the tungsten oxide powder for electrochromic devices according to the embodiment is preferable, and further preferable is a powder mass containing 90% by mass or more of the tungsten oxide powder. In other words, the powder material for electrochromic devices may contain 20% by mass or less of the tungsten oxide powder having no peripheral section. Alternatively, the powder material may contain 20% by mass or less of a compound powder other than a tungsten oxide, such as a molybdenum oxide powder, that exhibits electrochromism.

A slurry containing the tungsten oxide material according to the embodiment may be used as a slurry for producing electrochromic devices, as well. By preparing a slurry of the tungsten oxide material, an electrochromic layer can be formed through coating. For example, it is difficult to form a film over a large area by the sputtering method. With the form of the slurry, coating can be easily performed over a large area.

The slurry is obtained by mixing the tungsten oxide powder for electrochromic devices according to the embodiment and a solvent. Examples of the solvent include water and an organic substance. The tungsten oxide material according to the embodiment preferably accounts for 80% by mass to 100% by mass of the compound exhibiting color switching in response to application of electric charge, that is, the compound having electrochromism, contained in the slurry. For example, a slurry can be prepared by mixing the tungsten oxide powder mass for electrochromic devices with a solvent.

Next, a method of producing the tungsten oxide material according to the embodiment will be described. The method of producing the tungsten oxide material according to the embodiment is not limited as long as the tungsten oxide material has the above-described structure; examples of a method of producing the tungsten oxide material with a high yield are as follows.

Examples of the method of producing the tungsten oxide material according to the embodiment include two types of methods, a vapor phase method and a liquid phase method. In either production method, first, a precursor of tungsten oxide and a precursor of potassium are prepared.

If the vapor phase method is used, the K—$WO_3$ powder according to the embodiment is prepared, for example, as follows. A precursor of tungsten oxide and a precursor of potassium are mixed to obtain a mixture. The obtained mixture is subjected to a sublimation step to prepare the tungsten oxide powder. Specifically, in the synthesis in a vapor phase, mixing of a precursor of tungsten oxide and a precursor of potassium to obtain a mixture, sublimation of the mixture, and cooling of the sublimated gas for solidification are performed.

Examples of the precursor of tungsten oxide include ammonium tungstate, $WO_3$, $WO_2$, and $H_2WO_4$. Examples of the precursor of potassium include $K_2WO_4$. These precursors are preferable because impurities are less likely to enter if these compounds are used as precursors.

In the mixing step, the respective precursors are mixed in a powder state or a water slurry state so that the molar ratio of K to W becomes an amount corresponding to the target composition. By adjusting the mixing ratio of K to W in this mixing step, the ratio of K to W in the resulting K—$WO_3$ is controlled.

Here, the width of the peripheral section can be controlled by adjusting the mixing ratio (molar ratio) of tungsten to potassium. For example, if the raw material mixing ratio of potassium to tungsten contained in each precursor as a raw material ([mol amount of K]/[mol amount of W]) is 0.01 or less, it is difficult to obtain the peripheral section having the maximum width in the above-described preferable range. If the mixing ratio (molar ratio) is 0.5 or more, not only would the maximum width of the peripheral section become larger than the preferable range, but also, $K_2WO_4$ would be formed. Therefore, the mixing ratio (molar ratio) of potassium to tungsten in the precursor mixture is preferably less than 0.5.

The mixed powder or slurry is introduced into a plasma flame using argon (Ar), nitrogen (N), or oxygen (O) as a carrier gas and sublimated. For example, the precursor mixture is heated to 10000° C. or higher in a plasma flame to be sublimated. The sublimated gas is rapidly cooled to room temperature in an oxygen atmosphere to obtain a mixed oxide of potassium and tungsten. The particle size of the resulting powder particles can be controlled by controlling the rate at which the sample is introduced into the plasma. For example, by inputting the sample at 100 g/min or less, the average particle size can be made 100 nm or less.

If the liquid phase method is used, the K—$WO_3$ powder according to the embodiment is prepared, for example, as follows. In the synthesis in a liquid phase, dissolving a precursor of tungsten oxide in alkali, dissolving a precursor of potassium in water, mixing these two solutions, precipitating a powder, and recovering the obtained powder by filtration and drying are performed.

As the precursor of tungsten oxide, ammonium tungstate, $WO_3$, $WO_2$, or $H_2WO_4$, for example, can be used. This precursor of tungsten oxide is dispersed in water and dissolved by adjusting the pH within the range of 9 to 11 with ammonia or KOH.

Next, as the precursor of potassium, $K_2WO_4$ (potassium tungstate) or KOH (potassium hydroxide), for example, can be used. Here, both $K_2WO_4$ and KOH are dissolved by being mixed with water.

The aqueous solution of the precursor of tungsten oxide and the aqueous solution of the precursor of potassium are mixed in required amounts. When KOH is used to dissolve the precursor of tungsten oxide, mixing is performed so that the amount of W and the amount of K would be the required amounts including the amount of K in the KOH used for dissolution. Here, precaution should be taken regarding the amounts of W and K mixed. In the above-described vapor phase method, the mixing ratio of each precursor may be adjusted according to the content ratio of W and K in the target K—$WO_3$ because K added by the raw material (precursor of potassium) is entirely precipitated during solidification and becomes solid. In the liquid phase synthesis, even if the powder is precipitated, K and W partially remain in the mixed solution, and on top of that, more K than W remains in the solution. Therefore, a larger amount of K than the amount corresponding to the intended content ratio is mixed.

Next, K—$WO_3$ powder is precipitated by adjusting the pH of the solution obtained by dissolving the raw materials (respective precursors) in the basic aqueous solution to be in a range of pH 5 to 7 with a hydrochloric (HCl) acid solution. Sulfuric ($H_2SO_4$) or nitric ($HNO_3$) acid solutions may be used instead of hydrochloric acid. Here, the width of the peripheral section is controlled by adjusting the HCl concentration (mass ratio) of the hydrochloric acid solution (for example, aqueous hydrochloric acid) at the time of neutralization (adjustment to pH 5 to 7). Through precipitation with a HCl solution having a concentration of 30% by mass or less, a core of $WO_3$ is formed first, and a surface layer containing K is formed on the surface of the core. That is, a surface layer having a large abundance of K is formed as the peripheral section on the surface of the core having a small abundance of K as the central section. When precipitation is performed in a solution having a concentration of more than 30% by mass, W and K are precipitated concurrently, and the core of $WO_3$ serving as the central section is not formed. Thus, the peripheral section and the central section with varying crystal periodicity are not formed. The HCl concentration of the hydrochloric acid solution used for the neutralization treatment is preferably 5% by mass to 30% by mass.

The powdery precipitate obtained by the neutralization is filtered and dried to recover the powder. The drying temperature is in the range of 200° C. to 400° C. Heating at a temperature above 400° C. increases the particle size. At a drying temperature below 200° C., Cl remains in the powder.

The tungsten oxide material according to the embodiment is a tungsten oxide powder containing potassium and including particles having an average particle size of 100 nm or less. When the powder is analyzed according to the STEM, the periodicity of the crystal varies between the peripheral section and the central section. When this tungsten oxide material is used as a material for electrochromic devices, the rate of the reversible reaction is improved. In addition, electrochromic devices using the tungsten oxide material can be efficiently manufactured.

EXAMPLES

Examples 1 to 7 and Comparative Examples 1 to 3

A potassium-containing tungsten oxide powder was produced by the production method described above. In Examples 1, 2, 4, 6 and 7 and Comparative Examples 1 and 3, a precipitation step was carried out in a vapor phase. However, in Comparative Example 1, the precipitation step in the vapor phase was carried out using only a precursor of tungsten oxide. In Examples 3 and 5 and Comparative Examples 2 and 4, the precipitation step was carried out in a liquid phase.

Specifically, in Examples 1, 2, 4, 6, and 7 and Comparative Examples 1 and 3, a powdery tungsten oxide material was produced by the above-described vapor phase method under the following conditions. $WO_3$ and $K_2WO_3$ powders were prepared as precursors. These precursor powders were mixed in the mixing amounts shown in Table 1 to prepare a sample. The prepared sample was fed into an oxygen plasma together with a mixed gas of $N_2$:Ar=1:1 at the feed rate shown in Table 1. The sample passed through the plasma was discharged to a collecting apparatus under the conditions of air atmosphere, atmospheric pressure, and room temperature, and a powder generated by solidification there was collected.

TABLE 1

|  | $WO_3$ mixing amount (g) | $K_2WO_4$ mixing amount (g) | Sample feed rate (g/min) |
| --- | --- | --- | --- |
| Example 1 | 297.9 | 2.1 | 20 |
| Example 2 | 289.6 | 10.4 | 40 |
| Example 4 | 279.3 | 20.7 | 100 |
| Example 6 | 124.7 | 175.3 | 60 |
| Example 7 | 299.8 | 0.2 | 5 |
| Comparative Example 1 | 300 | 0 | 4 |
| Comparative Example 3 | 162.7 | 137.3 | 200 |

In Examples 3 and 5 and Comparative Examples 2 and 4, a powdery tungsten oxide material was produced through precipitation in a liquid phase under the following conditions. $K_2WO_4$ and $H_2WO_4$ were prepared as precursors. These precursors were dissolved in a basic aqueous solution in the mixing amounts shown in Table 2 below. The basic aqueous solution was set in the range of pH 9 to 11. A hydrochloric acid aqueous solution (HCl aqueous solution) having the concentration shown in Table 2 was added to the aqueous solution containing the dissolved precursors to neutralize the basicity. The aqueous solution after neutralization was in the range of pH 5 to 7. The deposited precipitate was collected by filtration and dried to obtain a powder.

TABLE 2

|  | $H_2WO_4$ mixing amount (g) | $K_2WO_4$ mixing amount (g) | HCl concentration (vol. %) |
| --- | --- | --- | --- |
| Example 3 | 227 | 200 | 30 |
| Example 5 | 167 | 101 | 25 |

TABLE 2-continued

|  | $H_2WO_4$ mixing amount (g) | $K_2WO_4$ mixing amount (g) | HCl concentration (vol. %) |
|---|---|---|---|
| Comparative Example 2 | 200 | 65 | 5 |
| Comparative Example 4 | 224 | 31 | 35 |

For the tungsten oxide powder obtained as described above in each example and each comparative example, the average particle size of particles included in the powder, the presence or absence of a central section and a peripheral section with varying crystal periodicity, the potassium content (ICP analysis and XPS analysis), the interatomic distance (central section and peripheral section), and the maximum width of the peripheral section were examined by the method described above. The results are shown in Tables 3 and 4 below. Specifically, the average particle size of the powder particles, the potassium content obtained by ICP analysis and XPS analysis, respectively, and the ratio $K_{XPS}/K_{ICP}$ are shown in Table 3. Table 4 shows the interatomic distances in the central section and the peripheral section of the powder particles, the ratio ($I_p/I_c$) of the interatomic distance ($I_p$) in the peripheral section to the interatomic distance ($I_c$) in the central section, and the maximum width of the peripheral section. In Comparative Examples 1 and 4, a central section and a peripheral section with varying crystal periodicity could not be confirmed, as shown in Table 3. Thus, in these comparative examples, the numerical values of the interatomic distances of the whole of the particles are shown for both the central section and the peripheral section in Table 4, for convenience. Also, since these comparative examples had no peripheral section, the width thereof was zero.

TABLE 3

|  | Average particle size (nm) | Presence or absence of central section and peripheral section varying in periodicity of crystal | Potassium content according to ICP analysis $K_{ICP}$ (mol %) | Potassium content according to XPS analysis $K_{XPS}$ (mol %) | Ratio of potassium contents according to XPS analysis and ICP analysis $K_{XPS}/K_{ICP}$ |
|---|---|---|---|---|---|
| Example 1 | 11 | Present | 1 | 1.1 | 1.1 |
| Example 2 | 15 | Present | 5 | 7.5 | 1.5 |
| Example 3 | 14 | Present | 9 | 11.7 | 1.3 |
| Example 4 | 10 | Present | 10 | 13.0 | 1.3 |
| Example 5 | 20 | Present | 33 | 102.3 | 3.1 |
| Example 6 | 30 | Present | 50 | 110 | 2.2 |
| Example 7 | 10 | Present | 0.1 | 0.12 | 1.2 |
| Comparative Example 1 | 8 | Not present | 0 | 0 | 0 |
| Comparative Example 2 | 200 | Present | 20 | 44 | 2.2 |
| Comparative Example 3 | 120 | Present | 75 | 150 | 2 |
| Comparative Example 4 | 15 | Not present | 10 | 10 | 1 |

TABLE 4

|  | Interatomic distance (Å) | | | Maximum width of peripheral section (nm) |
|---|---|---|---|---|
|  | Central section | Peripheral section | Peripheral section/ Central section | |
| Example 1 | 3.3 | 4.0 | 1.2 | 1.5 |
| Example 2 | 3.7 | 5.9 | 1.6 | 2 |
| Example 3 | 3.5 | 5.3 | 1.5 | 2.3 |
| Example 4 | 3.2 | 5.8 | 1.8 | 3 |
| Example 5 | 3.6 | 9.0 | 2.5 | 4.2 |
| Example 6 | 3.1 | 9.3 | 3 | 5 |
| Example 7 | 2.8 | 3.9 | 1.05 | 1 |
| Comparative Example 1 | 3.6 | 3.6 | 1 | 0 |
| Comparative Example 2 | 3.5 | 7.7 | 2.2 | 7 |
| Comparative Example 3 | 2.9 | 9.3 | 3.2 | 1.2 |
| Comparative Example 4 | 4.2 | 4.2 | 1 | 0 |

As shown in Table 3, a peripheral section with crystal periodicity varying from that of the central section was formed in the tungsten oxide powders according to Examples 1 to 7. Additionally, in these examples, the ratio $K_{XPS}/K_{ICP}$ of the potassium content obtained by each analysis method was 1.05 or more. Thus, it is recognized that the surface of the tungsten oxide powder contains a large amount of potassium.

Next, the electrical conductivity of the tungsten oxide powder according to each example and each comparative example was measured. The electrical conductivity was measured by the four terminal method described above. In addition, the angle of repose of each powder was measured by the method described above. The results thereof are shown in Table 5 below.

TABLE 5

|  | Electrical conductivity ($1/\Omega \cdot cm$) | Angle of repose (°) |
|---|---|---|
| Example 1 | $1 \times 10^{-5}$ | 38 |
| Example 2 | $8 \times 10^{-4}$ | 38 |
| Example 3 | $5 \times 10^{-4}$ | 35 |
| Example 4 | $2.4 \times 10^{-4}$ | 34 |
| Example 5 | $3 \times 10^{-3}$ | 31 |
| Example 6 | $1 \times 10^{-3}$ | 30 |
| Example 7 | $8 \times 10^{-6}$ | 40 |
| Comparative Example 1 | $2 \times 10^{-7}$ | 45 |
| Comparative Example 2 | $3 \times 10^{-6}$ | 52 |
| Comparative Example 3 | $2 \times 10^{-3}$ | 53 |
| Comparative Example 4 | $4 \times 10^{-6}$ | 37 |

As shown in Table 5, the tungsten oxide powders according to Examples 1 to 7 exhibited good electrical conductivity. The angle of repose was in the range of 30° to 45°, as well. It is demonstrated that the tungsten oxide powders according to Examples 1 to 7 have improved electrical conductivity and fluidity.

In contrast, the electrical conductivity was low in Comparative Example 1 due to not containing potassium. The fluidity was poor in Comparative Examples 2 and 3 because the average particle size of the powder particles exceeded 100 nm. With regard to Comparative Example 2, as the particle size was extremely large, the electrical conductivity is considered to have been low because voids were likely to be formed between the particles within the powder. The electrical conductivity of the tungsten oxide powder according to Comparative Example 4 was low because the central section and the peripheral section with varying crystal periodicity were not obtained in the particles even though potassium was contained.

Examples 8 to 11

More potassium-containing tungsten oxide powders were produced. In Example 11, a powdery tungsten oxide material was produced by the same vapor phase method as described in Example 1, except that the mixing amounts of the powders of $WO_3$ and $K_2WO_3$ as precursors and the feeding rate at which they were fed into an oxygen plasma were changed as shown in Table 6. In Examples 8 to 10, a powdery tungsten oxide material was produced by the same liquid phase method as described in Example 3, except that the mixing amounts of $K_2WO_4$ and $H_2WO_4$ as precursors and the concentration of the aqueous hydrochloric acid solution (aqueous HCl solution) were changed as shown in Table 7.

TABLE 6

|  | $WO_3$ mixing amount (g) | $K_2WO_4$ mixing amount (g) | Sample feed rate (g/min) |
| --- | --- | --- | --- |
| Example 11 | 299 | 1 | 100 |

TABLE 7

|  | $H_2WO_4$ mixing amount (g) | $K_2WO_4$ mixing amount (g) | HCl concentration (vol. %) |
| --- | --- | --- | --- |
| Example 8 | 232 | 72 | 10 |
| Example 9 | 255 | 85 | 15 |
| Example 10 | 180 | 1.5 | 30 |

For the tungsten oxide powders obtained in Examples 8 to 11, the average particle size of particles included in the powder, the presence or absence of a central section and a peripheral section with varying crystal periodicity, the potassium content (ICP analysis and XPS analysis), the interatomic distance (central section and peripheral section), and the width of the peripheral section were examined by the method described above. The results are shown in Tables 8 and 9 below. The content of Tables 8 and 9 for Examples 8 to 11 corresponds to the content of Tables 3 and 4 for Examples 1 to 7 and Comparative Examples 1 to 4.

TABLE 8

|  | Average particle size (nm) | Presence or absence of central section and peripheral section varying in periodicity of crystal | Potassium content according to ICP analysis $K_{ICP}$ (mol %) | Potassium content according to XPS analysis $K_{XPS}$ (mol %) | Ratio of potassium contents according to XPS analysis and ICP analysis $K_{XPS}/K_{ICP}$ |
| --- | --- | --- | --- | --- | --- |
| Example 8 | 100 | Present | 37 | 185 | 5.0 |
| Example 9 | 70 | Present | 40 | 164 | 4.1 |
| Example 10 | 15 | Present | 1.2 | 1.22 | 1.02 |
| Example 11 | 55 | Present | 1 | 4.8 | 4.8 |

TABLE 9

|  | Interatomic distance (Å) | | | Maximum width of peripheral section (nm) |
| --- | --- | --- | --- | --- |
|  | Central section | Peripheral section | Peripheral section/ Central section | |
| Example 8 | 3.2 | 8.6 | 2.7 | 4.5 |
| Example 9 | 3.3 | 9.6 | 2.9 | 4.8 |
| Example 10 | 3.6 | 4.0 | 1.1 | 2.0 |
| Example 11 | 3.4 | 5.2 | 1.5 | 3.3 |

As shown in Table 8, a peripheral section with crystal periodicity varying from that of the central section was also formed in the tungsten oxide powders according to Examples 8 to 11.

Next, the electrical conductivity and the angle of repose of the tungsten oxide powder according to Examples 8 to 11 were measured. The measurement was performed by the same method as that performed on the powders according to Examples 1 to 7. The results thereof are shown in Table 10 below.

TABLE 10

|  | Electrical conductivity $(1/\Omega \cdot cm)$ | Angle of repose (°) |
| --- | --- | --- |
| Example 8 | $2 \times 10^{-3}$ | 29 |
| Example 9 | $2 \times 10^{-3}$ | 28 |
| Example 10 | $3 \times 10^{-5}$ | 32 |
| Example 11 | $2 \times 10^{-5}$ | 31 |

As shown in Table 10, the tungsten oxide powders according to Examples 8 to 11 exhibited good electrical conductivity comparable to that of the tungsten oxide powders according to Examples 1 to 7 and obtained approximately the same value of the angle of repose.

According to at least one embodiment and example described above, a tungsten oxide material containing potassium, and a tungsten oxide powder mass for an electrochromic device and a slurry for producing an electrochromic device containing the tungsten oxide material are provided. The tungsten oxide material has a shape of particles with an average particle size of 100 nm or less. The particles of the tungsten oxide material include a central section and a peripheral section adjacent to the central section, and a periodicity of a crystal varies between the central section and the peripheral section. By using the tungsten oxide material, tungsten oxide powder mass for an electrochromic device, and a slurry for producing an electrochromic device as materials for an electrochromic device, rate of reversible reactions in the obtained electrochromic device can be improved. In addition, by using the tungsten oxide powder mass for an electrochromic device and slurry for producing an electrochromic device, production of electrochromic devices can be performed efficiently.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such embodiments or modifications as would fall within the scope and spirit of the inventions.

What is claimed is:

1. A tungsten oxide material comprising potassium, the tungsten oxide material having a shape of particles including a central section and a peripheral section adjacent to the central section and having an average particle size of 100 nm or less, a periodicity of a crystal varying between the central section and the peripheral section;

wherein the tungsten oxide material has a crystal structure in which plural phases intersecting with a direction from inside toward a surface of the particles and being parallel to each other are sequentially arranged in the direction, and an interatomic distance Ic between the plural phases adjacent to each other in the central section is different from an interatomic distance Ip between the plural phases adjacent to each other in the peripheral section, and wherein a ratio $I_p/I_c$ of the interatomic distance $I_p$ to the interatomic distance $I_c$ is within a range of 1.1 to 3.

2. The tungsten oxide material according to claim 1, wherein a content of the potassium is within a range of 1 mol % to 50 mol %.

3. The tungsten oxide material according to claim 2, wherein a ratio $K_{XPS}/K_{ICP}$ of a content $K_{XPS}$ of the potassium according to X-ray photoelectron spectroscopy to a content $K_{ICP}$ of the potassium according to an inductively coupled plasma emission spectrometric analysis method is 1.05 or more.

4. The tungsten oxide material according to claim 2, wherein the peripheral section has a maximum width of 1.5 nm to 5 nm.

5. The tungsten oxide material according to claim 1, wherein a ratio $K_{XPS}/K_{ICP}$ of a content $K_{XPS}$ of the potassium according to X-ray photoelectron spectroscopy to a content $K_{ICP}$ of the potassium according to an inductively coupled plasma emission spectrometric analysis method is 1.05 or more.

6. The tungsten oxide material according to claim 1, wherein the peripheral section has a maximum width of 1.5 nm to 5 nm.

7. The tungsten oxide material according to claim 1, wherein the interatomic distance Ic is within a range of 2.8 Å to 3.9 Å.

8. A tungsten oxide powder mass for an electrochromic device, the tungsten oxide powder mass comprising 80% by mass to 100% by mass of the tungsten oxide material according to claim 1.

9. A slurry for producing an electrochromic device, the slurry comprising the tungsten oxide material according to claim 1.

* * * * *